United States Patent [19]

Schulz et al.

[11] Patent Number: 5,429,441

[45] Date of Patent: Jul. 4, 1995

[54] PROCESS OF PRINTING WITH SERIAL PRINTHEAD

[75] Inventors: Harald Schulz; Friedrich-Wilhelm Drees, both of Berlin, Germany

[73] Assignee: Eastman Kodak Company, Rochester, N.Y.

[21] Appl. No.: 122,532

[22] PCT Filed: Mar. 24, 1992

[86] PCT No.: PCT/DE92/00250

§ 371 Date: Nov. 23, 1993

§ 102(e) Date: Nov. 23, 1993

[87] PCT Pub. No.: WO92/17340

PCT Pub. Date: Oct. 15, 1992

[30] Foreign Application Priority Data

Mar. 28, 1991 [DE] Germany ............ 41 10 776.4

[51] Int. Cl.⁶ ............................................. B41J 2/30
[52] U.S. Cl. ................................. 400/124.04; 395/108
[58] Field of Search ............... 400/121, 124, 124.01, 400/124.02, 124.04; 395/108, 111

[56] References Cited

U.S. PATENT DOCUMENTS

| | | | |
|---|---|---|---|
| 4,033,444 | 7/1977 | Beery | 400/124 |
| 4,521,123 | 6/1985 | Boehmer | 400/121 |
| 4,721,401 | 1/1988 | Malcolm | 400/121 |
| 4,737,041 | 4/1988 | Nakayama | 400/121 |
| 5,074,684 | 12/1991 | Yoshida et al. | 400/124 |
| 5,079,563 | 1/1992 | Starkweather et al. | 400/121 |

FOREIGN PATENT DOCUMENTS

| | | | |
|---|---|---|---|
| 186508 | 12/1991 | European Pat. Off. | 400/121 |
| 3834709 | 12/1990 | Germany | 395/108 |
| 1-275152 | 12/1991 | Japan | 400/121 |
| 90/14957 | 12/1990 | WIPO | 400/121 |

Primary Examiner—David A. Wiecking
Attorney, Agent, or Firm—Thomas C. Pontani

[57] ABSTRACT

A process for recording information on a recording substrate, in which a print head with number (a) of printing elements moves back and forth over print positions, one print line at a time. Partial numbers of printing elements form subgroups in accordance with predetermined formations specific to the print lines. These subgroups are allocated to the print positions of a print line and are formed by at least partly differing printing elements. The individual printing elements of the respective subgroup are selectively controlled at the print positions in accordance with print data to produce a print pattern line. On completion of a subsequent print pattern line, the predetermined formation for a subsequent print line conforms, at least on the continuation side, to the predetermined formation of the preceding print line. Stripes caused by line continuation errors or ink ribbon structure errors are distributed throughout the printed image so as to be vertically offset. In contrast to uniform structures, structures which are distributed in this way can barely be discerned by the human eye.

8 Claims, 3 Drawing Sheets

PROCESS OF PRINTING WITH SERIAL PRINTHEAD

BACKGROUND OF THE INVENTION

A process for recording information known from German Patent Publication DE-OS 38 34 709 uses a print head having a number of printing elements arranged in columns in a principle direction. The print head is moved line by line in a reciprocating manner relative to a recording substrate, its movement being directed perpendicular to a forward feed direction of the recording substrate (serial printer). During this reciprocating movement the print head passes over a plurality of print positions of a print line.

In the known process, a subgroup, which is the same for all print positions of a print line, is formed from a partial number of printing elements. The printing elements of the subgroup are selectively controlled at every print position according to predetermined print data. Accordingly, depending on the print datum of the respective printing element, ink may possibly be applied to the recording substrate. After passing across a print line, the recording substrate is advanced in accordance with the length of the subgroup in the forward feed direction. The print head can then continue to make recordings during the subsequent return movement (bidirectional printing) or only when a new advancing movement of the print head is effected (unidirectional printing).

If the forward feed of the recording substrate in serial printers does not correspond exactly to the respective height of the pattern which is printed line by line, adjacent print lines overlap presenting overlaid inked areas of superimposed lines (dark stripes), or are visibly distant from one another (light stripes). These effects of incorrect line spacing are referred to in the following as line continuation errors.

Such line continuation errors are caused, for example, by manufacturing tolerances in the mechanical feed of the recording substrate. Also, the amount of feed generally varies with the thickness of the recording substrate so that costly adjustment would be required in the case of recording substrates with different thickness.

Further, in a serial printer which works with an ink ribbon, stripes can also be formed when the ink ribbon is used up unevenly (referred to in the following as ink ribbon structure errors). Such stripes can also be brought about by failure of a printing element. The human eye is very sensitive to such linear structures disrupting the visual impression of the recorded information.

In the process known from German Patent Publication DE-OS 38 34 709 light stripes are prevented in that, in addition to the subgroup determined by the partial number of the printing elements, there is at least one printing element adjacent to the subgroup which is acted upon by the same print datum as its neighboring printing element of the subgroup. Accordingly, in the known process the formation of light—particularly noticeable i.e.—stripes between adjacent print lines is prevented within a wide range of tolerances, but at the expense of dark stripes in the region of the line continuation as a result of the deliberate overlapping of adjacent print lines. The effect of ink ribbon structure errors and failures of printing elements is not diminished by this known process.

In International Patent Application WO 90/14957 it is proposed, in order to prevent perception of uneven side edges of a recording pattern, to arrange print lines produced in bidirectional printing in such a way that their individual printing lines are interlaced. However, the problem of line continuation errors, ink ribbon structure errors and errors due to failure of printing elements persists in this known process as well, since errors can also cause horizontal structures in this case.

SUMMARY OF THE INVENTION

Therefore, the present invention has the object of providing a process for recording information in which stripe-like structures resulting from line continuation errors and/or ink ribbon structure errors can scarcely be perceived.

This object is met by a process for recording information according to predetermined print data by means of a print head with a number of printing elements in which the print head moves in a reciprocating manner across print positions of a print line. A subgroup of printing elements is allocated at least to every print position of a print line provided for recording and, by selecting a partial number of printing elements according to a predetermined formation individual to a print line, the subgroups are formed in such a way that the subgroups allocated to the print positions of a print line are at least partially made up of different printing elements. A print pattern line is formed by selectively controlling the printing elements of the respective subgroup at the print positions of a print line in accordance with the print data. Furthermore the recording substrate is advanced relative to the print head after a print pattern line is produced, and upon completion of a subsequent print pattern line the forward feed is dimensioned according to the length of the subgroups in the forward feed direction, and the predetermined formation for a subsequent print line conforms, at least on the continuation side, to the predetermined formation of the preceding print line. Extension in the forward feed direction means the projection of the alignment line of the subgroup (length of the subgroup plus a space between the printing elements) in the forward feed direction; when the alignment line and forward feed direction are parallel, the extension corresponds to the alignment line.

Within the context of the present invention, print head refers to a recording head suitable for producing patterns composed in mosaic form. Consequently, printing elements refers, e.g., to recording elements of a needle print head, ink-jet print head or thermal print head.

In the process according to the invention, the subgroups defined by the predetermined formation vary while passing over the print lines - i.e. at least after a predetermined number of print positions per print line. Accordingly, stripes caused by line continuation errors, ink ribbon structure errors or failure of a printing element are advantageously offset in the forward feed direction depending on the predetermined formation. The print pattern line produced subsequently directly adjoins the preceding print pattern line in that its predetermined formation, in addition to the forward feed, conforms to the predetermined formation of the preceding print line on the continuation side. Adjacent print lines accordingly mesh in the manner of gear teeth. The human eye is known to be substantially more sensitive to uniform pattern disturbances than to uneven or offset disturbances. Therefore, in the process according to the invention, the disturbing strips mentioned above are advantageously made imperceptible. When recording print line patterns covering the recording substrate from the uppermost to the bottommost print line, the concluding print line patterns are preferably formed in such a way that an even upper or lower closing edge is formed.

A further advantage of the process according to the invention consists in the inclusion of a plurality of printing elements, preferably all of the printing elements, in the recording process when printing a line. The heat given off by the printing elements is accordingly distributed in the print head in a relatively uniform manner so as to improve the print quality.

An advantageous development of the process according to the invention consists in that the predetermined formation is maintained for a plurality of consecutive print lines. When the predetermined formation remains constant for a number of consecutive print lines, preferably for all print lines, the expenditure on control means required for forming the subgroups is kept extremely low.

In an advantageous development of the process according to the invention in regard to printing speed and expenditure on control means for the printing elements, the subgroup is formed by printing elements which are consecutive in the forward feed direction.

If the information to be recorded consists of large dark areas or areas to be printed in grays, the partial number of printing elements forming a subgroup is advantageously selected so as to be approximately equal to half the number (roughly 50%) of printing elements of the print head. In this way stripes caused by line continuation errors, ink ribbon structure errors or failure of printing elements can be distributed over the entire recording surface with the process according to the invention. However, with regard to maximum printing speed, it is usually sufficient that the partial number amounts to approximately 90% of the number of printing elements.

According to another advantageous development of the process according to the invention, a periodic function is used as a predetermined formation. The (centers of the) subgroups accordingly vary periodically with reference to the print line, e.g. according to a sine function. As a result, stripes which may possibly occur are also distributed periodically (e.g. in a sinusoidal shape) in the recording and accordingly create a harmonious recorded image.

A distribution of stripes caused by line continuation errors, ink ribbon structure errors or failure of printing elements which is particularly advantageous with regard to control technique can be achieved by using a random function as the predetermined formation. The subgroups accordingly vary at random so that the eye does not recognize uniform structures.

In another advantageous development of the process according to the invention, a particularly unnoticeable distribution of stripes can be achieved in that subgroups which differ in at least one printing element are allocated to neighboring print positions of a print line. In this case, the position of possibly occurring stripes differs from one print position of a print line to another so that the human eye can no longer detect horizontal structures in adjacent print positions.

In an advantageous further development of the process according to the invention, a particularly nonhomogeneous distribution of the structures caused by line continuation errors, ink ribbon structure errors or failure of printing elements can be achieved in that the partial number determining the size of the subgroup is varied within a print line and in that the forward feed is adapted to the lowest partial number. A fixed (smallest) forward feed distance is preferably predetermined for all print lines.

In the following, the process according to the invention is explained in more detail with reference to the drawings.

DETAILED DESCRIPTION OF THE PREFERRED EMBODIMENTS

Figure 1:
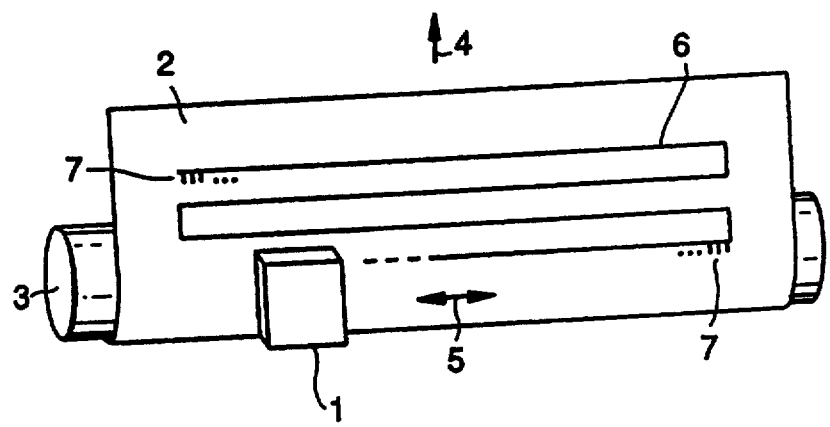
FIG. 1 shows a device for recording information suitable for carrying out the process according to the invention.

FIG. 1 shows a schematic perspective view of the basic arrangement of a print head 1 relative to a recording substrate 2 to be imprinted. The recording substrate 2 is guided past a print head 1 in a forward feed direction 4 in contact with a printing roller 3. The print head 1 can be reciprocated in the print line direction 5 perpendicular to the forward feed direction 4. With each reciprocating motion, the print head 1 passes over a plurality of print positions 7. To print on the recording substrate 2, the print head 1 executes, in its entirety, a relative movement 6 to the recording substrate 2.

Figure 2:
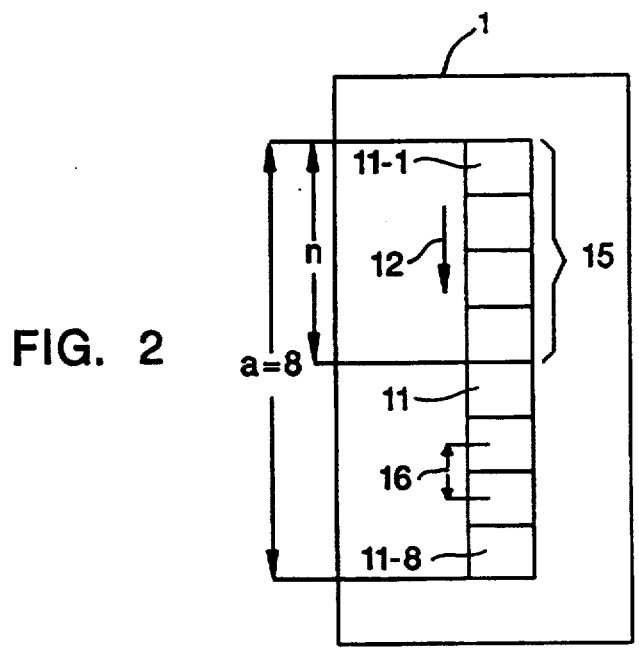
FIG. 2 shows a detail from FIG. 1.

FIG. 2 shows the print head 1, which is constructed as an ink-jet print head, from its side facing the recording substrate 2. The print head 1 has a number a (=8) of printing elements 11-1 to 11-8. Each printing element 11 contains an ink outlet jet and a drive element, not shown, which, when acted upon selectively by print data, causes a drop of ink to exit from the ink outlet jet so as to produce a corresponding ink dot when striking the recording substrate 2 (FIG. 1). The printing elements 11 are arranged along a principle direction 12. A partial number n of printing elements 11 selected from the number a forms a subgroup 15; only the printing elements 11 of the subgroups 15 are acted upon by print data at the print positions. After the print head 1 moves in one direction and produces a print pattern line, the recording substrate 2 is advanced in the forward feed direction 4 by an amount corresponding to the extension of the subgroup 15 in the principle direction 12, including a spacing 16 between two printing elements 11. Subsequently, the print head 1 is again acted upon by print data only within the scope of the respective subgroups 15 either during the return movement (bidirectional printing) or in a new advancing movement of the print head after the conclusion of the return movement. However, the respective subgroups 15 are formed by at least partly differing printing elements 11 from one print position 7 to the next (FIG. 1).

Figure 3:
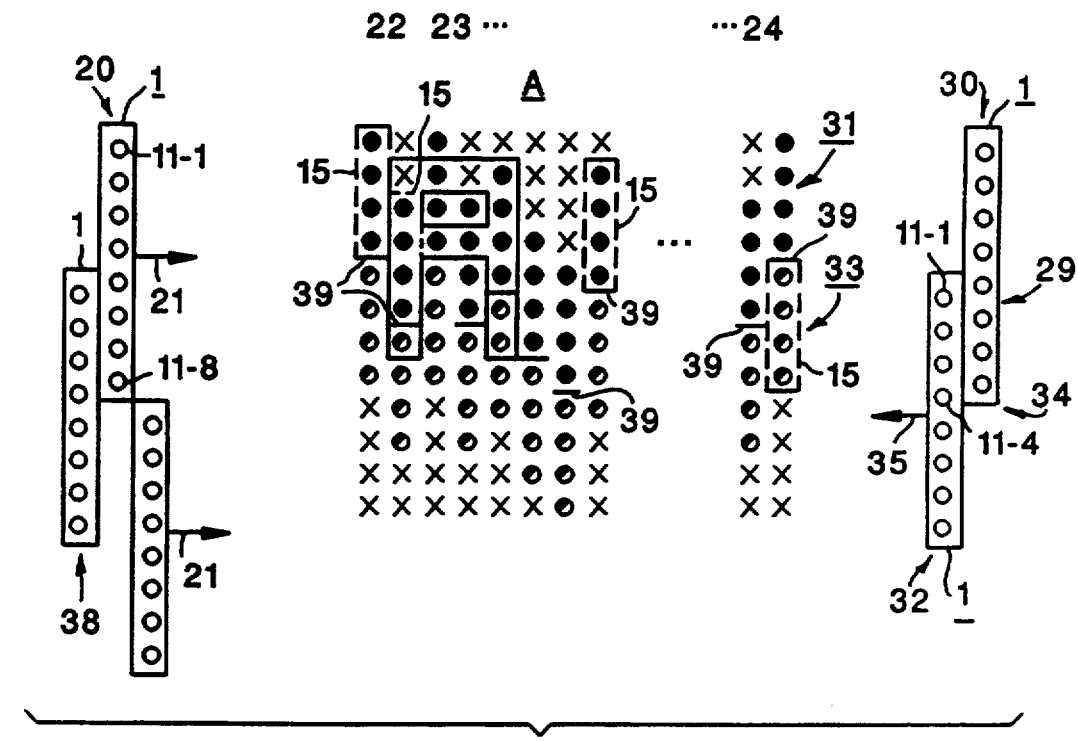
FIG. 3 shows a recorded pattern produced by the process according to the invention.

FIG. 3 shows a first recording pattern. A continuously printed area is selected as the recording pattern. FIG. 3 shows the printing elements 11-1 to 11-8 of the print head 1 in a first position 20 as viewed opposite the recording substrate 2 (FIG. 1). During its next movement in direction 21, the print head 1 passes over a first print position 22. In the embodiment example according to FIG. 3, the partial number of printing elements 11 is n=4 (FIG. 2) and the subgroup 15 for the print position 22 is formed by the uppermost four printing elements 11-1 to 11-4. Consequently, the uppermost four dots are formed at the first print position; the rest of the printing elements 11-5 to 11-8 are not controlled since they do not belong to the subgroup 15 associated with the print position 22 according to the predetermined formation for this print line. The print head 1 is then moved to the next print position 23. The raster of the print positions 22, 23 etc. preferably corresponds to the spacing 16 of the printing elements 11. In the second print position 23, the subgroup 15 is now formed by printing elements 11-3 to 11-6 according to the predetermined formation so that print dots are produced at the corresponding positions. The production of print dots continues in this way in movement direction 21, where four adjacent printing elements 11 form the subgroup 15 in each instance. After the conclusion of a print position 24 of a first print line 29 and after reaching a rest position 30, a print pattern line 31 is produced. The recording substrate 2 is then advanced in the forward feed direction 4 (FIG. 1) in such a way that the print head 1, instead of occupying the rest position 31, now occupies the position 32 relative to the recording substrate 2. The forward feed is dimensioned in such a way that it corresponds to the line formed by the four printing elements (e.g. 11-1 to 11-4) of the subgroup 15 adjoining one another in the principle direction 12, plus a spacing 16 between the printing elements 11.

In an oblique position of the print head 1, i.e. when the forward feed direction 4 and principle direction 12 define an acute angle, the projection of the line of the printing elements 11-1 to 11-4, including a spacing 16 in the forward feed direction 4 (FIG. 1), would determine the amount of forward feed.

The print head 1 then moves back in the direction 35 to produce a consecutive print pattern line 33 in another print line 34 using the same predetermined formation - but in reverse sequence in the case of bidirectional printing, i.e. beginning with print position 24. Therefore, as in the advancing movement, the subgroup 15 (FIG. 2) is formed by printing elements 11-1 to 11-4 in print position 24 and consequently produces print dots during the return movement. These print dots of the consecutive print pattern line 33 are shown in FIG. 3 as half-filled circles, but all print dots actually have the same form and color and are shown differently in the drawings only for the sake of clarity. The control of the respective subgroups 15 is effected in a corresponding manner for each print position 24 to 22 until the print head reaches a starting position 38. The print head 1 in the starting position 38 is offset toward the left in the drawing in relation to position 20 only for the sake of clarity. The process then starts again in direction 21 after the recording substrate 2 is advanced in a corresponding manner, as was described above. Structures 39 which occur as a result of line continuation errors are offset vertically in an irregular manner and are accordingly barely perceptible.

To obtain an even closing edge of an area filling up the recording substrate and produced by the process according to the invention, the head carries out a recording motion (without forward feed of the recording substrate 2) before the first possible print line and after the last possible print line, in which motion the upper four printing elements 11-1 to 11-4 or the bottom four printing elements 11-5 to 11-8 are controlled in such a way that they fill gaps which are designated by X in FIG. 3. This filling of gaps can also be effected concurrently with the formation of the first or last print line.

Figure 4:
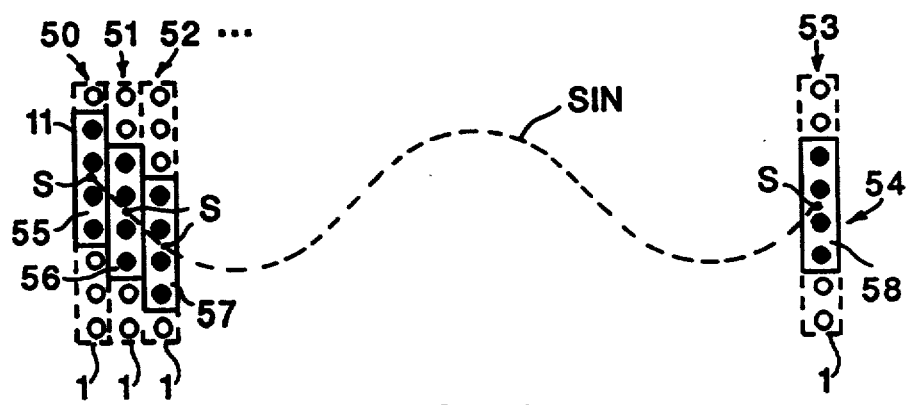
FIG. 4 shows the use of a periodic function as a predetermined formation for generating the subgroups.
Figure 5:
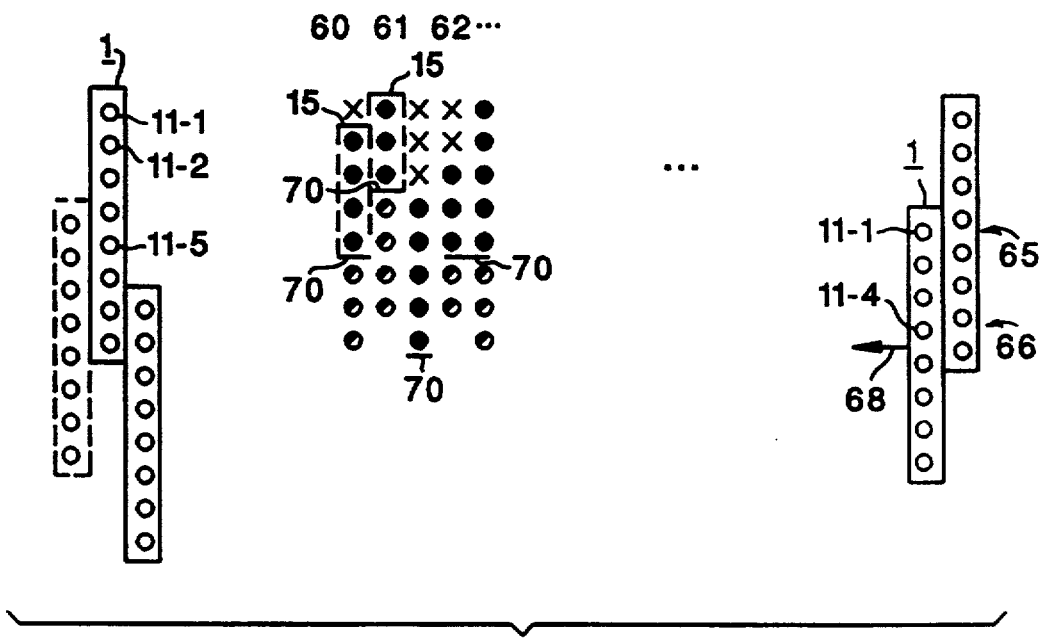
FIG. 5 shows another recorded pattern.

For the sake of clarity and by way of example, the area indicated in FIGS. 3 to 5 is completely blackened by dots. Of course, alphabetic characters (as indicated in FIG. 3 by A), etc. can also be recorded insofar as the respective printing elements of the respective subgroups are acted upon selectively by print data.

The composition of the subgroups 15 - with reference to their center, i.e. their linear focal point - can be formed by using a random function (FIG. 3) or, e.g., by using a periodic function as the predetermined formation. FIG. 4 shows subgroups 55, 56, 57 and 58 which are allocated to different print positions 50, 51, 52 and 53 of a print line 54 and are formed, as described above, from selected printing elements 11 of the print head 1. The predetermined formation is a periodic function (sine function) so that the linear focal points S of the subgroups 55, 56, 57 and 58 run along a sine function SIN.

FIG. 5 shows a print pattern occurring in a further modification of the process according to the invention. A different partial number n of printing elements 11 forms a subgroup 15 (FIG. 2) from print position 60 to print position 61, etc. As can be seen at print position 60, the first subgroup 15 for this print position 60 is formed from n =4 printing elements 11-2 to 11-5, whereas the subgroup at print position 61 is formed by only n=3 printing elements 11-1 to 11-3 (with advancing movement along a print line 65).

During the return movement for producing another print pattern in a print line 66 in return direction 68, the print dots represented by the half-filled circles are produced by the print head 1 in that, e.g. at the print position 61, the printing elements 11-1 to 11-4 are controlled during movement of the print read in the return direction 68 after the corresponding forward feed of the recording substrate. The respective amount of forward feed of the recording substrate is determined by the lowest number of associated printing elements 11 (starting from the uppermost printing element 11-1) forming a subgroup. The process is simplified by selecting a constant forward feed determined in the manner described above. In the present case, this forward feed distance amounts to the spacing of three printing elements 11, including the spacing 16 provided between the printing elements 11. FIG. 5 also shows a distribution of structures 70 due to line continuation errors which is extremely uneven and therefore barely perceptible to the human eye.

Although bidirectional printing is described in relation to FIGS. 3 and 5, the process according to the invention can, of course, also be applied to unidirectional printing (i.e. recording during advancing or returning movement) in a correspondingly advantageous manner.

Figure 6:
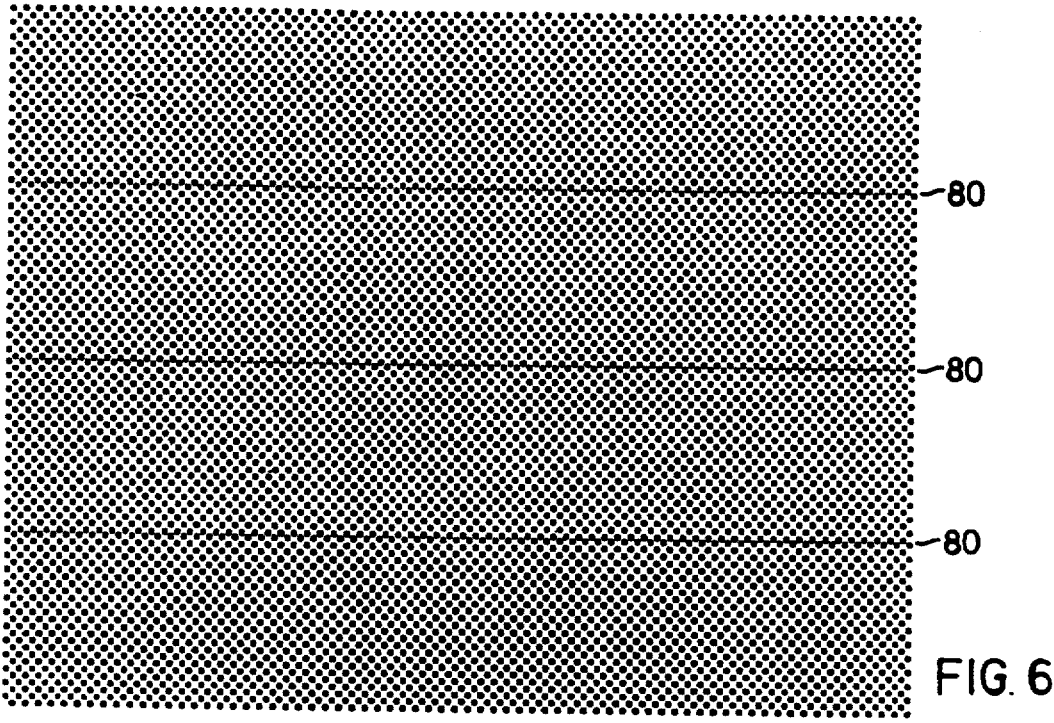
FIG. 6 shows a pattern produced according to a known process.

FIG. 6 shows a pattern produced according to the process known from German Patent Publication DE-OS 38 34 709, in which a print head with 50 printing elements has been used. For purposes of comparison, however, only 25 printing elements are controlled and a 50-percent gray print is produced by alternately controlling only every second printing element. The pattern clearly shows dark lines 80 which are caused by a negative line continuation of −1.2% (i.e. the lines are too closely spaced) and a consequent overlapping of the print lines.

Figure 7:
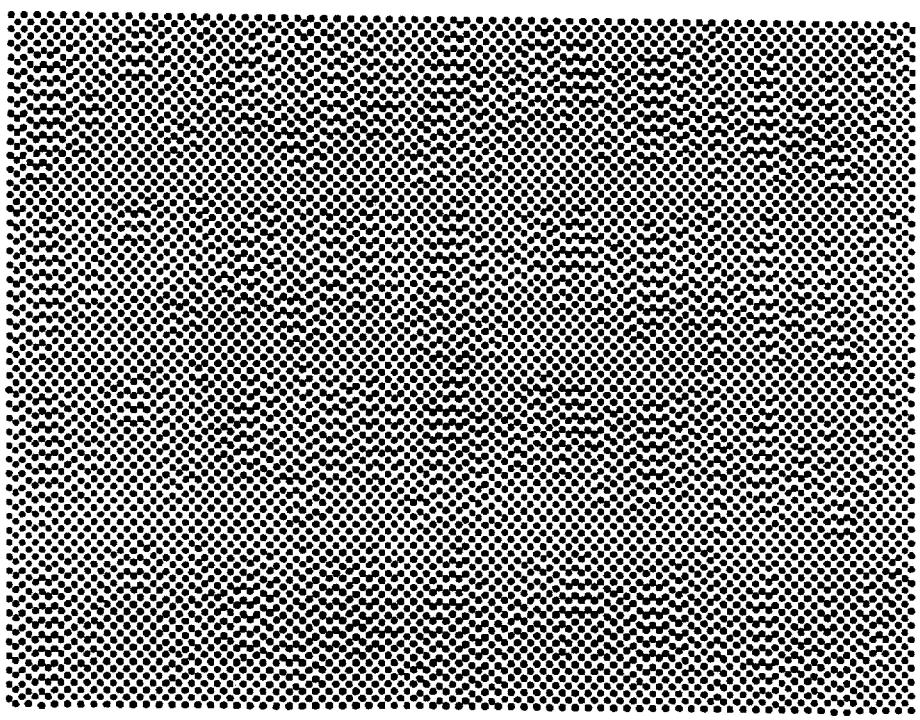
FIG. 7 shows a pattern produced by the process according to the invention.

In contrasts FIG. 7 shows a 50-percent gray print which is likewise produced by 25 controlled printing elements of a print head, but in which the subgroup of printing elements has been varied in each instance as explained in detail in the preceding description. FIG. 7 shows a random distribution (i.e. a random function was chosen as the predetermined formation) of the stripes caused by line continuation errors and which is barely perceptible to the human eye. When considering FIGS. 6 and 7, it should be noted that the patterns are greatly enlarged so that the gray print according to FIG. 7 in its actual size gives a virtually uniform impression, whereas the lines 80 in FIG. 6 remain clearly discernable.

Thus, in the process according to the invention, the printing elements belonging to a subgroup float in the principle direction of the print head, thus resulting in a vertical, offset distribution of the structures caused by line continuation errors or ink ribbon structure errors. The adjoining print patterns mesh in the manner of gear teeth so that the human eye can no longer detect uniform disturbing structures as a whole.

We claim:

1. A process for recording information on a recording substrate in accordance with predetermined print data by means of a print head having a total number of printing elements, comprising the steps of:

moving the print head in a reciprocating manner across print positions of a print line to be printed on the substrate;

allocating a subgroup of printing elemems at least to each of a plurality of print positions along the print line at which data is to be recorded in accordance with the predetermined print data, each said subgroup being formed by selecting a partial number of the printing elements of the print head less than said total number in accordance with a predetermined formation by which the subgroups allocated to the plural print positions of the print line are at least partially formed by different printing elemems of the print head;

forming a print pattern line on the substrate by selectively controlling at each print position along the print line only the printing elements of the subgroup allocated for said each print position in accordance with the predetermined print data;

advancing the recording substrate relative to the print head, after the print pattern line is produced, along a forward feed direction and by a forward feed amount dimensioned in accordance with an extension of the subgroups in the forward feed direction; and conforming a predetermined formation for a subsequent print line to the predetermined formation of a preceding print line.

2. A process according to claim 1, wherein said conforming step further comprises maintaining the predetermined formation for a plurality of consecutive print lines.

3. A process according to claim 1, wherein said allocating step further comprises forming each said subgroup of printing elements that are disposed on the print head in adjacent relation in the forward feed direction.

4. A process according to claim 1, wherein said allocating step further comprises forming each said subgroup by selecting the printing elements so that the partial number is approximately 50% of the total number of printing elements.

5. A process according to claim 1, wherein said allocating step further comprises selecting a partial number of the printing elements in accordance with a predetermined formation defined by a periodic function.

6. A process according to claim 1, wherein said allocating step further comprises selecting a partial number of the printing elements in accordance with a predetermined formation defined by a random function.

7. A process according to claim 1, wherein said allocating step further comprises allocating subgroups that differ by at least one selected printing element to neighboring print positions of a print line.

8. A process according to claim 1, wherein said allocating step further comprises selecting a partial number that varies from one print position to another print position within a print line, and wherein said advancing step further comprises advancing the recording substrate relative to the print head by a forward feed amount dimensioned in accordance with a lowest partial number of the print positions along the print line.

* * * * *